Patented Dec. 5, 1950

2,532,295

UNITED STATES PATENT OFFICE 2,532,295

THERMAL PROCESS FOR PRODUCING THE CARBIDES OF TANTALUM AND COLUMBIUM

Daniel Gardner, New York, N. Y.

No Drawing. Application September 14, 1946, Serial No. 697,154

10 Claims. (Cl. 23—208)

This invention is a thermal process for producing the carbides of tantalum and columbium wherein, by chemical reactions carried out by elevated temperatures, the starting compound is converted or transformed into the carbide; the starting compound being, by high preference, the pentachloride of tantalum and/or columbium, although to less advantage the process may commence with the pentafluoride of one or both of the metals whose carbide is to be produced. If the supply of the material on hand consists of pentoxide it is the plan of this invention first to convert the same to the pentachloride and thereupon carry out the process as in one or more of the examples of the invention hereinafter set forth at length. In referring to columbium this is the same element which in certain countries is known as niobium.

The general objects of the present invention are to afford the economical production of the mentioned carbides by a novel process and the steps thereof which are practical and reliable and adapted to yield the carbides in pure form. More specific objects of the invention, and the advantages thereof will be made to appear in the hereinafter following description of typical examples of the invention or will be understood by those conversant with the subject. The field of utility of the products of this invention are wide, paralleling to a large extent the industrial uses of other carbides, including uses dependent upon the high degree of hardness afforded, the adaptability of the materials for use as abrasives, uses where high refractory properties are important, and various other uses; and a special field of utility for tantalum carbide hereby produced is in connection with instances wherein high electric conductivity is important even at high elevated temperatures, including cases of electronic and other special equipment.

Much of the data relating to the two elements are set forth in prior copending application, Serial No. 683,765, filed July 15, 1946, now Patent No. 2,516,865, directed to the refining of the said metals from their concentrates. For brevity the two elements will herein frequently be referred to by their chemical symbols Ta and Cb; and the same with other elements and various compounds hereinafter referred to; and in some cases the symbol R may be used as a designation for either one of the two metals Ta and Cb or the two of them combined. Thus, the formula RC may indicate the carbide TaC and/or CbC. In this application all recited temperatures are those of the centigrade system.

In this application the treatments of the materials and compounds of both Ta and Cb are intimately combined and described, for the reason, among others, that said elements are in some respects closely analogous and related, both of them being in periodic group V, each of them having its more usual valence of five, both having very high melting and boiling points, and both of them being found in common in certain natural compounds of minerals; and it is part of the present discovery that the intermixed compounds of the two may be treated in unison for their conversion and reduction.

Since the general subject in discussion is relatively novel and recent, that is, having had but little intensive research and development, it is deemed appropriate to precede the description of the invention by a general outline of certain pertinent portions of the past history and available present data concerning the two elements tantalum and columbium and their carbides.

Tantalum carbide, TaC, and columbium carbide, CbC, belong to the class of high refractory materials which have today conquered the attention of industry. The important properties of these two compounds are:

Table A

| Properties | TaC | CbC |
|---|---|---|
| Molecular weight (M. W.) | 193.4 | 104.91. |
| Specific gravity (D) | 13.96 | 7.82. |
| Melting point (M. P.) | 4150° | 3500°. |
| Boiling point (B. P.) | 5500° | 4600°. |
| Heat of formation (ht. f. at 25°) | 78.8 Cal | 45.0 Cal. |
| Specific heat (sp. ht.) | .088 | .098. |
| Soluble in acids | HF, aqua regia | HF. |
| Soluble in alkalies | in molten alk | in molten alk. |
| Crystallographic system | cubes | cubes. |
| Specific resistance | $1.75 \times 10^{-4}$ ohm-cm | $1.47 \times 10^{-4}$ ohm-cm. |
| Hardness | 9–10 | 9–10. |
| Magnetic properties | paramagnetic | paramagnetic. |
| Electric Conductivity | high, neg. $t°$ coefficient; superconductive. | Same as Ta to less degree. |

Both carbides are attacked by the oxygen of the air only at very elevated temperatures. The magnetic and electric properties of both carbides have favored the suggestion of considering these two extremely stable compounds to be like certain metal alloys. They may be used separated from each other or combined or alloyed. The numerous applications of the two carbides have rendered them extremely important in various modern industrial developments.

A short review of prior art will best explain the chief lines of development of this chapter in the carbide industry, covering the most important developments of the last seventy years. The temperatures stated in describing the prior art and examples of the application of this invention are given in degrees centigrade. In 1876 Joly (Ann. Sci. Ecole Normale, vol. 6, pp. 142–148, 1877) produced the two carbides by heating to a temperature of 1450° in a carbon crucible of tantalum pentoxide well mixed with powdered sodium carbonate and sugar, these yielding a high grade carbon, whereby tantalum carbide TaC was formed. Also, Joly mixed powdered potassium niobate (columbate) with potassium carbonate and sugar, also heating the mixture to 1450° in a carbon crucible, whereby he obtained columbium carbide, CbC. Similar research was carried out by this applicant in 1909 with euxenite, which is a hydrated niobate and titanate of yttrium, uranium, cerium, thorium and zirconium, containing up to or over 32 percent of columbium pentoxide, found in a granite rock in pegmatite dykes in Ontario; also with pyrrhite found in feldspar from Mursinsk, Perm, Russia, containing chiefly niobate of zirconium, related to pyrochlore; wherein applicant then applied the method of Joly. The carbides so obtained contained excess of carbon, as was determined by analysis.

An increase of interest in the two carbides appeared during World War I, and particularly just thereafter, about 1920. About 1925 Becker and Ebert (Z. Physik, vol. 31, p. 268, 1925) suggested heating columbium oxide with carbon in a current of hydrogen, at 1200°. In the case of tantalum oxide it was suggested to work at 1250° in a tubular furnace. About 1927 Van Arkel (Chem. Weekblatt, vol. 24, p. 90, 1927) observing the low yields at 1200°–1250°, suggested admixing hydrogen with carbon monoxide, passing the gases through an electrically heated coiled tungsten or carbon filament at an elevated temperature of 2600–3200°.

A few years later about 1931 Agte and Moers (Z. anorgan. Chem., vol. 198, p. 262, 1931) suggested replacing the two oxides by gasified columbium pentachloride, using as gas or atmosphere such hydrocarbons as methane and acetylene but retaining the idea of the incandescent filament, passing the current at 2600–3200°. Another suggestion was made about 1930 by Becker and Ewest (Z. techn. Physik., vol. 11, p. 148, 1930) to heat a filament of tantalum, such as used before that in tantalum glowing lamps, in an atmosphere of methane gas; and suggested also the decomposition of tantalum pentachloride vapors passing over a tungsten filament, electrically heated to 2000°–2250°; in vapors of toluene, $C_7H_8$, at a pressure of .1 mm. of mercury. Encouraging results were published in 1930 by Agte and Altherthum (Z. techn. Physik., vol. 11, p. 182, 1930), who used columbium wire, or its oxide, mixed with carbon, in a tubular furnace, by somewhat reducing the temperature but above all by taking precautionary measures to avoid air, in order to guarantee against nitride formation.

A year later in 1931 Agte and Moers (Z. anorg. Chem., vol. 198, p. 262, 1931) suggested lowering the temperature of heating of a mixture of powdered metal and carbon, agglomerated to rods previously sintered at 2500°–3000°, to a temperature of 1700°; then treating the so-obtained rods as resistance rods, just above the fusion temperatures of the metals, namely, tantalum 2850° and columbium 1950°, whereby a brown hard and brittle carbide resulted. Then in 1932 Andrews (J. Amer. Chem. Soc., vol. 51, p. 1845, 1932) published his results dealing with the heating of tantalum wire under reduced pressure, at a temperature between 2000°–2800° in vapors of benzene, napthalene, and the like; whereby a grey, silvery carbide is obtained, of the proposed formula TaC, characterized by a great electrical resistivity, namely $180.65 \times 10^{-6}$ ohm-cm. at ordinary temperature or low heat. The product is very brittle, with a high fusion temperature and of the cubic system. Further publications were made, but they did not throw much more advanced suggestions to solve this highly important problem.

When summarizing the results of the prior art, it is possible to conclude that, as far as starting materials were used, they have been the metals, the oxides or the mixture of the metals and oxides; also the gaseous halides, chiefly vapors of the pentachlorides. In regard to starting with the metals, Ta and/or Cb, the purest preparation of which is in itself a special art and comparatively costly, their use for making the carbides can be justified only in exceptional cases, such as the application of the high abrasive qualities of the carbides. The use of the oxides, or their admixture with the powdered metals, can hardly be practically considered, since the results obtained are practically unreliable and very seldom identical; usually there is overlapping carbon, or a nitride or some other impurity, which may originate from the carbon used.

There thus remains to consider the use of gaseous halides, the chlorides and fluorides of Ta and/or Cb, as a source of soluble derivatives of the two metals. Both halides have advantageously low melting points, but the use of the pentachlorides is obviously preferable to the pentafluorides, since the latter often yield free hydrofluoric acid, which is an ingredient that, at higher temperatures, can attack the carbide formed, which may result in a considerable loss in these two metals, with less production.

The present invention is distinguished essentially from the prior known efforts. As regards the ingredients used, it is preferred to introduce chiefly gaseous compounds of carbon, such as hydrocarbons preferably, working at the lowest practical temperatures, and employing ingredients which yield compounds easily removable from the system, whereby the reaction should be of an exothermic nature.

This invention deals only with purest halides of tantalum and columbium, preferably their pentachlorides, although the pentafluorides can also be used, if special precautionary measures are taken. In the below Tables B and C are the data concerning these two compounds.

Table B

| Properties | TaCl$_5$ | CbCl$_5$ |
| --- | --- | --- |
| Molecular weight | 358.2 | 270.2. |
| Specific gravity | 3.68 | 2.75. |
| Melting point | 221° | 194°. |
| Boiling point | 242° | 240.5°. |
| Heat of formation (at 25°) | 197.2 Cal | 175.0 Cal. |
| Specific heat | .109 | .121. |
| Soluble in acids | acetic acid, sat.HCl | HCl. |
| Soluble in organic solvents | abs. alcohol | CCl$_4$, abs. alcohol. |
| Soluble in other solvents | CS$_2$, acetone | CS$_2$, ether. |
| Specific conductivity (at 230°) | 0.3×10$^{-6}$ | 0.22×10$^{-6}$ rec. ohm. |
| Reduced by | Mg, Al, Pb, Sn, also by Zn. | Same as TaCl$_5$. |

It will be noted that neither of the pentachlorides is a good conductor of electric current, as shown by Hampe (Chem.Ztg., vol. 11, p. 1110, 1887); also that both salts are attacked by humidity and therefore require special care. The best solvent is carbon disulphide, as suggested about 1928 by Funk and Niederlaender (Ber. 61, p. 249, 1928) also about 1922 by Ruff and Thomas (Z.anorg.Chem., vol. 156, p. 1688, 1926; also Ber. 55, p. 1467, 1922.) Both pentachlorides have the marked tendency to form oxychlorides. Also from them chlorides with lowered content of chlorine can be derived.

Table C

| Properties | TaF$_5$ | CbF$_5$ |
| --- | --- | --- |
| Molecular weight | 275.9 | 187.91. |
| Specific gravity | 4.74 | 3.29. |
| Melting point | 96.8° | 75.5°. |
| Boiling point | 229.5° | 229.0°. |
| Heat of formation (at 25°) | 277.0 Cal | 246.0 Cal. |
| Specific heat | .114 | .129. |
| Soluble in acids | HF, HCl | H$_2$SO$_4$.HNO$_3$. |
| Soluble in organic solvents | sl CCl$_4$, ether | C$_7$H$_8$, par. oil. |
| Soluble in other solvents | sulphur chloride, TiCl$_4$, POCl$_3$ | CCl$_4$. |
| Soluble in conc. alkalies | from tantalate gradually | from niobate gradually. |
| Crystalline form | prisms | monoclinic. |

As further data upon the halide salts TaF$_5$ and CbF$_5$ oxyfluorides are easily formed therefrom. The salts are very hygroscopic. Both salts attack lead and tin, forming dark black powders; but they do not react with oxygen, nitrogen, phosphorus, arsenic, antimony or gold; also not with aluminium or magnesium. Besides, vapors of TaF$_5$ do not react, even at boiling point, with hydrogen, iron, sulphur, zinc, copper or silver.

Research work carried out with the pentachlorides of tantalum and columbium have brought applicant to the conclusion, that only when no substance other than the carbide is left behind, all other ingredients formed being either in gaseous form or easily removable without impairing the carbide, and only when the process can be carried on at the lowest practical temperature, is it possible to produce reliably a uniform high grade carbide, free of the impurities which usually contaminate the carbide, which, unless freed therefrom, no longer maintains two of its most characteristic features, crystalline structure and hardness.

Starting invariably with the same compound (RCl$_5$), the pentachloride of tantalum or columbium or a mixture thereof, (or with RF$_5$) and working always in an atmosphere containing hydrogen or a hydrocarbon and containing a source of carbonaceous matter, which may be said hydrocarbon or other carbon containing products, usually acting in a current of hydrogen, and sometimes diluted by an inert gas, and performed as a continuous operation, using in some cases light metals as reducing agents, such as aluminium, magnesium, calcium or the like, applicant has successfully obtained at an advantageously low temperature, the formation of purest tantalum carbide and columbium carbide, or their mixture. In some cases all by-product matter formed was removed with practical ease, and without in any way affecting or impairing the carbide so formed; in other examples with more difficulty.

The improvement thus indicated of the present invention is herein exemplified by a series of examples each embodying the essence of the improvement as a process for producing the pure carbides of tantalum and/or columbium. The respective examples constitute different species of the basic improvement, all embodying certain common features, steps or agents, and each constituting a variation of independent novelty and utility.

Before describing the several below examples the common principles thereof may be outlined as follows. The improvement is a process for producing the carbide or carbides of the two R elements, Ta and/or Cb, from the pentachloride or chlorides thereof (with the fluorides as a considerably less desirable alternative) as a starting compound, the process comprising the following steps and agents. The first step comprises reacting chemically the starting chloride at elevated temperature with a combination of chemical agents, these being in association with the starting chloride before and during the reaction. The agent combination includes a carboniferous agent which may be a hydrocarbon or a carbide or other carbon compound adapted to yield carbon for the purposes of the reaction. Next there is a hydrogen-containing agent which may consist of hydrogen gas or hydrocarbon or another hydrogen compound other than hydrogen chloride. The reaction between the recited three substances, and auxiliary ones that may be of advantage, causes the chlorine constituent of the starting chloride to be taken up by one or more of the constituents of said agents other than the carbon thereof, and the same preferably is taken up by the hydrogen constituent thereof thereby to form hydrogen chloride; the reaction further causing the tantalum and/or columbium constituent of the starting compound to combine with a carbon constituent of said agents thereby to form as a product the carbide or carbides of said tantalum and/or columbium. Under this process, finally, there are separated away from said carbide product the byproducts of such reaction, passing off mainly as gases or vapors; and if so desired the product carbides of tantalum and/or columbium may be separated from each other when both are present. Following such principles, in Example A the reaction agents consist of carbon tetrachloride and hydrogen. In Example B they consist of calcium carbide and hydrogen. In Example C they comprise methane and a powdered light metal as magnesium or aluminium and a catalyst to promote the decomposition of the methane. The individual examples thus referred to will next be disclosed in further detail, and other examples could be set forth but are deemed unnecessary.

When the two carbides are not desired in combination or alloy they may be separated in any suitable way; but it is preferred to effect the separation at an earlier stage, for example, in the form of pentachlorides, or even at the outset before conversion to such chlorides.

*Example A*

When vapors of the pentachloride $RCl_5$ of tantalum, or columbium, or both, are heated with vapors of carbon tetrachloride $CCl_4$ to a temperature above 600°, in a current of hydrogen, preferably diluted by an inert gas, such as argon, helium or the like, the reactions occur as follows:

$$2TaCl_5 + 2CCl_4 + 9H_2 = 2TaC + 18HCl + 108.9 \text{ Cal.}$$

$$2CbCl_5 + 2CCl_4 + 9H_2 = 2CbC + 18HCl + 85.7 \text{ Cal.}$$

These reactions take place by virtue of the fact that carbon tetrachloride, which is the final stage of a metalepsic substitution (as termed by Dumas) of the four hydrogen atoms in methane by chlorine, and is stable as a compound, upkeeps such stability only up to 600°, above which its carbon either acts as a reducing agent, or combines to form a carbide. So, for example, when passing heated vapors of $CCl_4$ over a red-hot pentoxide of tantalum or columbium $R_2O_5$, in the first instance the pentachlorides are formed as follows:

$$Ta_2O_5 + 3CCl_4 = 2TaCl_5 + COCl_2 + 2CO_2 + 79.4 \text{ Cal.}$$

$$Cb_2O_5 + 3CCl_4 = 2CbCl_5 + COCl_2 + 2CO_2 + 92.0 \text{ Cal.}$$

The reaction can be easily discovered by the odor of carbon oxychloride formed, this method being the process of the applicant for producing pure pentachlorides of tantalum and columbium, which can be distilled off and are of extreme purity, and thus highly suitable to convert to the carbides under this example.

By raising the temperature above 760° and introducing the hydrogen, purest carbides are easily obtained.

*Example B*

It has already been established, partly by applicant in British Patent No. 465,421 of 1937 (see "Technology of Magnesium and Its Alloys," by Dr. E. A. Beck, London, F. A. Hughes and Co. Ltd., 1940, pp. 15–16) that calcium carbide $CaC_2$ reduces magnesium sulphide $MgS$ to metal (also U. S. Patent No. 2,147,645 of 1939). In that process a temperature of 1200° to 1600° was recommended. It was found that if the vapors of the pentachloride of tantalum (columbium) are brought into contact with powdered calcium carbide in an agent having a high content of $CaC_2$, in a current of hydrogen, then at the temperature of about 1200° the reaction occurs as follows:

$$2TaCl_5 + 2CaC_2 + 4H_2 = 2TaC + 6HCl + 2CaCl_2 + C_2H_2 + 233.5 \text{ Cal.}$$

$$2CbCl_5 + 2CaC_2 + 4H_2 = 2CbC + 6HCl + 2CaCl_2 + C_2H_2 + 170.3 \text{ Cal.}$$

Or, if larger proportions of calcium carbide are used, then the reaction occurs in the following way at about the same temperature:

$$2TaCl_5 + 5CaC_2 + 4H_2 = 2TaC + 5CaCl_2 + 4C_2H_2 + 426.5 \text{ Cal.}$$

$$2CbCl_5 + 5CaC_2 + 4H_2 = 2CbC + 5CaCl_2 + 4C_2H_2 + 403.5 \text{ Cal.}$$

However, considering the work done by Biesalski and Van Eck about 1928 (Z. angew. Chem., vol. 41, p. 720, 1928; also Chem. Zentralbl., p. 1806 of 1928, part II), as well as the work done about 1894 by H. Moissan (C. R., vol. 118, p. 501, 1894) it was found that calcium carbide, in the presence of sulphur, when the temperature has reached 270°, yields carbon disulphide $CS_2$ and free carbon; and that at 500° chiefly calcium sulphide $CaS$ is obtained, liberating carbon disulphide, which delivers its carbon in an easier way, namely:

$$CaC_2 + 3S = CS_2 + CaS + C + 76.9 \text{ Cal.}$$

wherefore it became possible to lower considerably the temperature of the previous reaction, to just over 600°, which occurs thus:

$$2TaCl_5 + CaC_2 + S + 5H_2 = 2TaC + CaS + 10HCl + 82.4 \text{ Cal.}$$

$$2CbCl_5 + CaC_2 + S + 5H_2 = 2CbC + CaS + 10HCl + 59.2 \text{ Cal.}$$

The calcium sulphide can be easily removed, being soluble in acids. However, there exists a considerable drawback in applying this method, since calcium carbide easily deteriorates during crushing and handling and even during storage. This method is mentioned here mainly because it is relevant to the steps followed in the next example.

*Example C*

It having been established as early as 1922 that the pentachlorides of tantalum and/or columbium are reduced by such light metals as magnesium and aluminium (Ruff and Thomas, Ber. 55, p. 1467, 1922) and it having also been shown about 1898 by P. Sabatier and Senderens (C. R., vol. 124, p. 616, 1898, and also C. R. 131, p. 267, 1900) that the decomposition of methane begins, in the catalytic presence of nickel, by the time 390° is reached, whereas without the nickel methane would start to decompose only above 800° and fully disintegrate only at 1200°, applicant conceived the plan of joining these two reactions, which was found to give a good result around 600°, with reaction as follows:

$$2TaCl_5 + 2CH_4 + 4Mg = 2TaC + 4MgCl_2 + 2HCl + 3H_2 + 381.9 \text{ Cal.}$$

$$2CbCl_5 + 2CH_4 + 4Mg = 2CbC + 4MgCl_2 + 2HCl + 3H_2 + 358.7 \text{ Cal.}$$

Thereby an extremely pure carbide is obtained, one of the reasons being that magnesium does not form a carbide under the circumstances; and the magnesium chloride is easily removed, and the hydrochloric acid gas is collected as such.

As already mentioned, aluminium also reacts to reduce the pentachlorides of tantalum and columbium, which takes place according to the following equation:

$$3TaCl_5 + 5Al = 3Ta + 5AlCl_3 + 217.4 \text{ Cal.}$$

$$3CbCl_5 + 5Al = 3Cb + 5AlCl_3 + 284.0 \text{ Cal.}$$

A few equations, using various hydrocarbons as a carbon source, such as methane, acetylene and even benzene, will explain the reaction which takes place below the melting point 658.8° of aluminium.

$$3TaCl_5 + 3CH_4 + 5Al = 3TaC + 5AlCl_3 + 6H_2 + 396.5 \text{ Cal.}$$

$$3CbCl_5 + 3CH_4 + 5Al = 3CbC + 5AlCl_3 + 6H_2 + 361.7 \text{ Cal.}$$

$$3TaCl_5 + 5Al + 2C_2H_2 = 3TaC + 5AlCl_3 + CH_4 + 581.5 \text{ Cal.}$$

$$3CbCl_5 + 5Al + 2C_2H_2 = 3CbC + 5AlCl_3 + CH_4 + 546.7 \text{ Cal.}$$

$$3TaCl_5 + 5Al + C_6H_6 = 3TaC + 5AlCl_3 + C_3H_6 + 447.6 \text{ Cal.}$$

$$3CbCl_5 + 5Al + C_6H_6 = 3CbC + 5AlCl_3 + C_3H_6 + 402.8 \text{ Cal.}$$

It is found also that other hydrocarbons can be used for the same purpose.

When using aluminium, in presence of hydrocarbons such as methane $CH_4$ which easily give up a part of their carbon, it is to be borne in mind that with a temperature as low as between 600° and 750° aluminium carbide can be formed; therefore, to avoid having this impairment happen, great care must be exercised not to elevate the temperature too high.

As already indicated, the starting pentachlorides can be replaced by the pentafluorides when available, and fair results are obtainable; but applicant's observation is that the use of the pentachlorides, so easily prepared as stated above, is more suitable practically for the industrial purposes.

What is claimed is:

1. The process for producing the carbide of a metal of the metal group consisting of tantalum, columbium and mixtures thereof, from a starting material which contains as a compound of such group metal a halide of the halide group consisting of the pentachloride and the pentafluoride of such metal; comprising reacting the same in gaseous phase at a temperature of the order of about 600° to 760° C., in mixture with a hydrogeniferous agent providing at such temperature gaseous hydrogen to combine chemically with and remove the halogen constituent of such halide, and a carboniferous agent yielding at such temperature freed carbon to combine chemically with the group metal constituent of such halide; and separating the resulting carbide from the byproducts of the reaction.

2. The process as in claim 1 and wherein the carboniferous agent is a hydrocarbon gas.

3. The process as in claim 1 and wherein the carboniferous agent is methane gas.

4. The process as in claim 1 and wherein the carboniferous agent is calcium carbide.

5. The process as in claim 1 and wherein the carboniferous agent is calcium carbide, and wherein the mixture contains a small proportion of sulphur to combine with the calcium and form calcium sulphide readily removable by acid treatment.

6. The process as in claim 1 and wherein the carboniferous agent is carbon tetrachloride, becoming unstable at the reaction temperature and thereby yielding freed carbon for the main reaction, the released chlorine being taken up by the hydrogen to form hydrogen chloride.

7. The process for producing the carbide of a metal of the metal group consisting of tantalum, columbium and mixtures thereof, from a starting material which contains as a compound of such group metal a halide of the halide group consisting of the pentachloride and the pentafluoride of such metal; comprising the step of reacting the same in gaseous phase at a temperature of the order of about 600° to 760° C., in mixture with an atmosphere providing gaseous hydrogen to combine chemically with and remove the halogen constituent of such halide, and carbon tetrachloride decomposing at such temperature and yielding freed carbon to combine chemically with the group metal constituent of such halide.

8. The continuous process for producing the carbide of a metal of the metal group consisting of tantalum, columbium and mixtures thereof, from a starting material which contains as a compound of such group metal a halide of the halide group consisting of the pentachloride and the pentafluoride of such metal; said process being performed during travel through the furnace, and comprising reacting such halide in gaseous phase at a temperature of the order of about 600° to 760° C., in mixture with a flowing current of hydrogen gas to combine chemically with and remove the halogen constituent of such halide, and with a small proportion of an inert gas, for dilution, and a carboniferous agent yielding at such temperature freed carbon to combine chemically with the group metal constituent of such halide; and separating the resulting carbide from the byproducts of the reaction.

9. The process for producing the carbide of a metal of the metal group consisting of tantalum and columbium from a starting material which contains a halide of the halide group consisting of the pentachloride and pentafluoride of such metal; comprising reacting the same in gaseous phase at a temperature of the order of about 600° to 760° C., in mixture with (1) a first agent providing at such temperature gaseous hydrogen to combine chemically with and remove the halogen constituent of such halide, and (2) a second agent yielding at such temperature freed carbon to combine chemically with the group metal constituent of such halide; and (3) an added reducing agent consisting of a small proportion of a powdery exothermic light metal adapted to start or promote the decomposition of the halide and the carbon-yielding agent and thereby the formation of the carbide of the original group metal; while the light metal is converted to the halide thereof, permitting easy elimination; and separating the resulting carbide from the byproducts of the reaction.

10. The process for producing tantalum carbide from tantalum pentachloride; comprising reacting the same in gaseous phase at a temperature of the order of about 600° to 760° C., in mixture with gaseous hydrogen to combine chemically with and remove the chlorine constituent of such chlorine, and a carboniferous agent consisting of methane yielding at such temperature freed carbon to combine chemically with the tantalum constituent of such chloride; and separating the resulting carbide from the byproducts of the reaction.

DANIEL GARDNER.

REFERENCES CITED

The following references are of record in the file of this patent:

UNITED STATES PATENTS

| Number | Name | Date |
|---|---|---|
| 2,124,509 | McKenna | July 19, 1938 |

FOREIGN PATENTS

| Number | Country | Date |
|---|---|---|
| 485,021 | Great Britain | May 13, 1938 |

OTHER REFERENCES

Burgers et al.: "Z. Anor. Allgem. Chem.," vol. 216, 1934, pages 209-22.